United States Patent Office 3,082,216
Patented Mar. 19, 1963

3,082,216
PRODUCTION OF 4,4-DISUBSTITUTED 5-ALKYL-IDENE-1,3-DIOXOLANE-2-ONES
Peter Dimroth and Heinrich Pasedach, Ludwigshafen (Rhine), Germany, assignors to Badische Anilin- & Soda-Fabrik Aktiengesellschaft, Ludwigshafen (Rhine), Germany
No Drawing. Filed Sept. 27, 1960, Ser. No. 58,646
Claims priority, application Germany Sept. 29, 1959
7 Claims. (Cl. 260—340.2)

This invention relates to a novel process for the production of 4,4-disubstituted 5-alkylidene-1,3-dioxolane-2-ones which have not hitherto been known.

1,3-dioxolane-2-ones are usually prepared from epoxides and carbon dioxide. According to this method it is not possible, however, to prepare 1,3-dioxolane-2-ones which contain an exocyclic double linkage.

It is an object of this invention to prepare new and polymerizable 5-alkylidene-1,3-dioxolane-2-ones.

This object is achieved by reacting a tertiary acetylene alcohol whose hydroxy group is adjacent to the triple linkage with carbon dioxide under pressure and in the presence of copper compounds and amines.

The reaction may be represented by the following scheme:

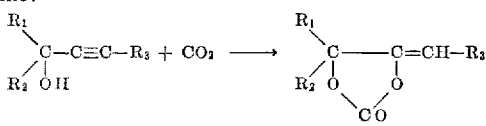

in which $R_1$ and $R_2$ represent identical or different aliphatic, cycloaliphatic, araliphatic, aromatic or heterocyclic radicals which may also contain inert substituents and which together may be members of a cycloaliphatic ring, and $R_3$ represents a hydrogen atom or an alkyl, cycloalkyl, aralkyl or aryl radical which may also be substituted by inert groups.

Tertiary acetylene alcohols which may be used are those of the general formula:

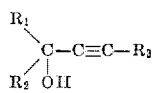

in which $R_1$, $R_2$ and $R_3$ have the meanings given above.

In the acetylene alcohols of this general formula which we prefer, $R_1$ and $R_2$ represent saturated and unsaturated aliphatic hydrocarbon radicals with 1 to 15 carbon atoms, cycloaliphatic hydrocarbon radicals with 5 to 12 carbon atoms in the cycloaliphatic ring, aromatic hydrocarbon radicals of the benzene series and heterocyclic radicals of the pyridine series, and $R_1$ and $R_2$ together may also represent 4 to 11 methylene groups of a cyclo aliphatic ring. All these radicals may contain as groups which are inert under the conditions of the process, hydroxy groups, alkoxy groups or acetal groups, (geminal dialkoxy groups), the two latter being derived from alcohols with 1 to 4 carbon atoms, or disubstituted amino groups, the two substituents being alkyl groups with 1 to 4 carbon atoms, or together with the nitrogen atom form a 5- or 6-membered heterocyclic ring which may contain an oxygen or nitrogen atom in addition to the first-mentioned nitrogen atom. Especially preferred are tertiary acetylene alcohols which contain at least one hydrogen atom vicinal to the hydroxy group.

In the preferred acetylene alcohols, $R_3$ represents a hydrogen atom, an alkyl group with 1 to 10 carbon atoms or an aromatic hydrocarbon radical of the benzene series, an alkyl group which also contains a free hydroxy group or an alkoxy or acetal group both derived from lower alcohols with 1 to 4 carbon atoms, or a disubstituted amino group in which the substituents on the nitrogen atom are alkyl groups with 1 to 4 carbon atoms or together with the nitrogen atom form a five- or six-membered heterocyclic ring which in turn may contain, in addition to the nitrogen atom, an oxygen atom or another nitrogen atom.

The term "aromatic hydrocarbon radicals of the benzene series" is intended to include phenyl and phenyl substituted by one or more hydrocarbon radical with up to 6 carbon atoms. Examples of this type of substituted phenyl are para-tolyl, 2,4-dimethyl-phenyl and diphenylyl. By the term "heterocyclic radicals of the pyridine series" we mean α-, β- and γ-pyridyl and pyridyls substituted by a hydrocarbon radical with up to 4 carbon atoms, such as methyl and ethyl.

These tertiary acetylene alcohols are obtained in the usual way, for example from the corresponding ketones and acetylene or acetylene compounds by a so-called ethinylation reaction.

The following may be given as examples of acetylene alcohols which may be used:

3-methyl-1-butine-3-ol,
3-methyl-1-pentine-3-ol,
3-methyl-1-hexine-3-ol,
3-methyl-1-octine-3-ol,
3,5-dimethyl-1-hexine-3-ol,
3-ethyl-1-pentine-3-ol,
3-normal-butyl-1-heptine-3-ol (di - normal - butyl ethinyl carbinol),
3,7-dimethyl-6-octene-1-ine-3-ol (dehydrolinalool),
3,7,11 - trimethyl-dodeca-6,10-diene-1-ine-3-ol (dehydronerolidol),
3-cyclohexyl-1-butine-3-ol,
3-cyclo-octyl-1-butine-3-ol,
3-phenyl-1-butine-3-ol,
3-para-tolyl-1-butine-3-ol,
1-ethinyl-cyclopentanol (3,3-tetramethylene-1-propine-3-ol),
1-ethinyl-cyclohexanol (3,3-pentamethylene-1-propine-3-ol),
1-ethinyl-cyclo-octanol (3,3-heptamethylene-1-propine-3-ol),
1 - ethinyl-cyclododecanol (3,3-undecamethylene-1-propine-3-ol),
3,α-pyridyl-1-butine-3-ol,
3,4-dimethyl-1-pentine-3,4-diol,
3-(1'-hydroxycyclohexyl)-1-butine-3-ol,
3-para-hydroxyphenyl-1-butine-3-ol,
3-methyl-4-methoxy-1-butine-3-ol,
3-meta-methoxyphenyl-1-butine-3-ol,
3-methyl-4,4-dimethoxy-1-butine-3-ol,
3-methyl-4,4-dibutoxy-1-butine-3-ol,
3-methyl-6-diethylamino-1-hexine-3-ol,
2-methyl-2-hydroxy-3-pentine,
2-methyl-2-hydroxy-3-dodecine,
1,1-pentamethylene-5-hexene-3-ine-3-ol,
1-(1'-hydroxycyclohexyl)-1-propine,
1-phenyl-3-hydroxy-3-methyl-1-butine,
1-para-tolyl-3-hydroxy-3-methyl-1-butine,
1,1-diphenyl-2-propine-1-ol,
2,5-dimethyl-3-hexine-2,5-diol,
1-methoxy-4-methyl-4-hydroxy-2-pentine,
1-(1'-hydroxycyclohexyl)-3-methoxy-1-propine,
5-diethylamino-2-methyl-3-pentine-2-ol,
3-dibutylamino-1-(1'-hydroxycyclohexyl)-1-propine,
3-morpholino-1-(1'-hydroxycyclohexyl)-1-propine,
3-pyrrolidino-1-(1'-hydroxycyclohexyl)-1-propine,
3-piperidino-1-(1'-hydroxycyclohexyl)-1-propine,
2-methyl-5-butyroxy-3-pentine-2-ol, and
2-methyl-5-acetoxy-3-pentine-2-ol.

As catalysts, copper-I and copper-II compounds are used which yield copper-I or copper-II ions. The copper salts may be derived from strong or weak acids, from inorganic or organic anions or from complex compounds. Copper-I chloride, copper-II salts of organic carboxylic acids, such as copper-II formate, acetate, stearate, benzoate and copper-II sulfate and nitrate. The copper catalysts are used in amounts of 0.1 to 1% by weight, but an excess (up to about 10%) with reference to the acetylene alcohol used is not deleterious. In addition to the copper salts, a small amount of amines, about 0.02 to 10% by weight with reference to the acetylene alcohol, is added. Usually, 0.02 to 2% is sufficient. The amines must exhibit a definite basicity. Their dissociation constant in water should be more than $10^{-5}$. This basicity is achieved by aliphatic, cycloaliphatic and araliphatic amines of five- and six-membered heterocyclic amines with the amine nitrogen in the heterocyclic ring. Primary, secondary and tertiary amines may be used, and tertiary amines of the aliphatic, cycloaliphatic and araliphatic series and cyclic amines are especially suitable. For example normal butylamine, normal octylamine, di-normal-butylamine, dicyclohexylamine, but especially trimethylamine, triethylamine, tributylamine, dimethylbenzylamine, N-butylpyrrolidine, N-ethylmorpholine and N-methylpiperidine may be used.

The carbon dioxide is forced in under increased pressure, pressures of 3 to 10, for example about 5, atmospheres being sufficient. Higher pressures, namely about 50 atmospheres, however, are generally used, but even higher pressures, for example 100 atmospheres may also be used.

The reaction proceeds even at slightly elevated temperature, for example at 30° to 50° C., but in general it is preferred to work at 50° to 130° C., although it is also possible to heat up to 200° C.

The temperature and pressure are important for the course of the reaction from the point of view of the reaction period. The reaction speed increases with increasing temperature. Carrying out the reaction at the lower limit of temperature therefore necessitates long reaction periods; at the upper temperature limit of about 200° C., however, side reactions occur to a certain extent. Increase in pressure also leads to high reaction speeds. Thorough mixing of the reaction mixture is advantageous for the progress of the reaction.

The reaction may be carried out either without solvent or with the coemployment of a solvent, which is inert under the conditions of the process, for example aliphatic, cycloaliphatic or aromatic hydrocarbons, halogenated hydrocarbons, open and cyclic ethers, ketones, esters and nitrobenzene. For example, iso-octane, petroleum ether, cyclohexane, benzene, toluene, ethylene chloride, carbon tetrachloride, diethyl ether, di-normal-butyl ether, dioxane, tetrahydrofurane and cyclohexanone may be used. The choice of solvent is not decisive for the course of the process. The coemployment of solvents is especially convenient when reacting solid acetylene alcohols.

The process may be carried out discontinuously, for example as follows: The acetylene alcohol containing the copper salt and the amine dissolved or suspended therein is introduced into an autoclave and carbon dioxide forced in at room temperature at a pressure of, for example, 5 to 50 atmospheres until saturation has been effected. Then for some time, for example about 3 to 10 hours, the whole is heated, for example at 30° to 50° C. and later slowly heated to 70° to 120° C. and kept for some hours at this temperature. After cooling and de-compression, the reaction mixture can be separated directly by distillation, possibly under reduced pressure. It is also possible with long reaction periods to obtain the end product by one stage at 30° to 40° C., or immediately to force in carbon dioxide at a high temperature.

The process may also be carried out continuously, for example as follows: The acetylene alcohol with the catalyst constituents is trickled through a heated vertical tube reactor provided with filled bodies and at the same time forcing in carbon dioxide at a pressure of about 50 atmospheres. At this pressure and a temperature of 80° C., the reaction product, possibly in admixture with unreacted initial material, may be withdrawn from the lower end of the reactor, the residence period being about half an hour. It is also possible to work continuously according to the so-called sump process in which carbon dioxide is forced continuously through a mixture consisting of the initial material, the copper compound and the amine, the supply of initial material and the withdrawal of the end product taking place in such a way that mixing of the two is substantially avoided.

The alkylene compounds obtainable according to this invention are new compounds. They may be polymerized, by reason of their double linkage of the vinyl type, in the same way as other vinyl compounds like vinyl acetate. The polymers are vitreous transparent solid products and resemble polymethacrylates. The new alkylene monomers may be used as anti-icing agents.

According to their structural formulae, the new compounds are to be regarded as cyclic carbonic esters. They can be saponified with the usual agents, $\alpha$-hydroxyketones being obtained, the primarily formed $\alpha$-hydroxyenols being immediately rearranged to form hydroxyketones. The hydroxyketones can be used for known purposes. For example, if there is a hydrogen atom vicinal to the hydroxy group, they can be converted into the corresponding $\alpha,\beta$-unsaturated ketones by splitting of water. Thus, for example, according to British Patent 569,373, methyl-isopropenylketone is obtained by splitting off water from 2-methyl-butane-3-one-2-ol. As is known from U.S. Patent 2,656,333, the said $\alpha,\beta$-unsaturated ketones can be co-polymerized with vinylchloride to produce impact-resistant copolymers.

The following examples will further illustrate this invention but the invention is not restricted to these examples. The parts are by weight. The tertiary acetylene alcohols used as initial materials are produced by the process described in Liebig's Annalen der Chemie 596 (1955), pages 30 et seq.

*Example 1*

250 parts of 3-methyl-1-butine-3-ol, 5 parts of copper-I-chloride and 10 parts of triethylamine are heated in an autoclave for 12 hours at 80° C. under a carbon dioxide pressure of 50 atmospheres gage.

By distillation of the reaction product, 338 parts (i.e., 90% of the theory) of 5-methylene-4,4-dimethyl-1,3-dioxolane-2-one with a boiling point of 82° C. at 12 mm. Hg. It solidifies upon cooling and has a melting point of 32° C.

By using 5 parts of other copper compounds and otherwise proceeding in the same manner the following yields are obtained:

| Copper compound: | Yield, parts |
|---|---|
| Copper-II-acetate | 318 |
| Copper-II-formate | 329 |
| Copper-I-stearate | 322 |
| Copper-II-nitrate | 310 |
| Copper-II-chloride | 316 |
| Copper-II-sulfate | 90 |
| Copper acetonylacetate | 334 |
| 5 parts copper benzoate and 30 parts triethylamine | 310 |
| 5 parts copper-II-carbonate and 30 parts triethylamine | 295 |
| 50 parts of ion exchanger Dowex 1 (basic ion exchanger on polystyrene basis containing quaternized ammonium groups) laden with copper ions | 274 |

By using 5 parts of copper-I-chloride, but different amines, the following results are obtained:

| | Yield, parts |
|---|---|
| 20 parts butylamine | 220 |
| 5 parts diethylamine | 332 |
| 10 parts isopropylamine | 240 |
| 10 parts di-isopropylamine | 296 |
| 10 parts dibutylcyclohexylamine | 310 |
| 10 parts dimethyloctadecylamine | 294 |
| 10 parts dimethylbenzylamine | 330 |
| 10 parts tributylamine | 315 |
| 10 parts triethylamine | 338 |
| 10 parts trimethylamine | 328 |
| 10 parts N-butylpyrrolidine | 340 |
| 10 parts N-methylpiperidine | 342 |
| 10 parts N-methylmorpholine | 340 |

By using 250 parts of 3-methyl-1-butine-3-ol, 5 parts of copper-I-chloride, 10 parts of triethylamine as well as 300 parts of one of the following solvents, the following results are obtained:

Solvent used:

| | Yield, parts |
|---|---|
| Benzene | 264 |
| Tetrahydrofurane | 332 |
| Dioxane | 342 |
| Diethylether | 328 |
| Petroleum ether (boiling range 40 to 60° C.) | 246 |
| Ethyl acetate | 308 |
| Carbon tetrachloride | 268 |
| Decahydronaphthalene | 236 |
| n-Butanol | 220 |

Example 2

250 parts of 3-methyl-1-butinol-(3), 250 parts of dioxane, 5 parts of copper acetate and 10 parts of triethylamine are heated in an autoclave under 50 atmospheres gage pressure of carbon dioxide for 12 hours at 60° C. After distilling the reaction product, 341 parts of 5-methylene-4,4-dimethyl-1,3-dioxolanone-(2) are obtained, i.e., 91% of the theory.

Example 3

The procedure of Example 2 is followed but copper-II-chloride is used instead of copper acetate and tributylamine instead of triethylamine. 331 parts of 5-methylene-4,4-dimethyl-1,3-dioxolanone-(2), i.e., 88% of the theory, are obtained.

Example 4

40 parts by volume of a mixture of 1000 parts of 3-methyl-1-butinol-(3), 6 parts of copper-I-chloride and 15 parts of triethylamine are dripped per hour into an autoclave which is filled with grains of pumice about 4 mm. in diameter, under a pressure of 50 atmospheres gage of carbon dioxide at a temperature of 80° C. 1228 parts of 5-methylene-4,4-dimethyl-1,3-dioxolanone-(2) are obtained per 1000 parts of 3-methyl-1-butine-3-ol, i.e., 83% of the theory.

Example 5

The procedure of Example 1 is followed but 250 parts of 1-ethinyl-cyclohexanol-1 are used instead of methyl butinol. 308 parts of a compound of the formula:

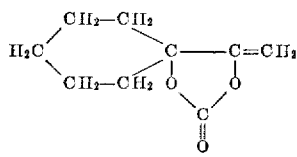

with the boiling point 134° C. at 12 mm. Hg; $n_D^{25}=1.4770$, are obtained; this is 90% of the theory.

Example 6

The procedure of Example 1 is followed, but 250 parts of dehydrolinalool are used instead of methyl butinol. 300 parts of 5-methylene-4-methyl-4-(4'-methyl-pentene-(4')-yl)-1,3-dioxolanone-(2) with the boiling point 136° C. at 14 mm. Hg ($n_D^{25}=1.4648$) are obtained, i.e., 91% of the theory.

Example 7

250 parts of 3-methylbutine-(1)-ol-(3), 5 parts of copper-I-chloride and 10 parts of triethylamine are saturated in an autoclave under a pressure of 5 atmospheres gage of carbon dioxide at room temperature for 24 hours while stirring vigorously. Then the whole is heated to 70° C. within 48 hours while stirring vigorously, a carbon dioxide pressure of 5 atmospheres gage being maintained by forcing in carbon dioxide. The reaction mixture is heated under 5 atmospheres gage of carbon dioxide for another 72 hours. By subsequent distillation, 45 parts of 3-methyl-1-butine-3-ol and 224 parts of 5-methylene-4,4-dimethyl-1,3-dioxolane-2-one are obtained.

Example 8

The procedure of Example 7 is followed but 250 parts of 1-ethinylcyclohexanol-(1) are used instead of 3-methyl-butine-(1)-ol-(3). By distillation, 80 parts of 1-ethinylcyclohexanol and 140 parts of 5-methylene-4,4-pentamethylene-1,3-dioxolane-2-one are obtained.

Example 9

630 parts of 3,5-dimethyl-hexine-(1)-ol-(3):

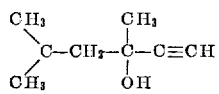

(B.P. 78° C at 50 mm. Hg; $n_D^{25}=1.4334$), parts of tetrahydrofurane, 5 parts of copper-I-chloride and 10 parts of triethylamine are saturated at 30° C. under a pressure of 40 atmospheres gage of carbon dioxide and then stirred for 15 hours at 100° C. under 40 atmospheres gage of carbon dioxide.

By distillation, 734 parts of 5-methylene-4-methyl-4-isobutyl-1,3-dioxolane-2-one with the boiling point 96° C. at 8 mm. Hg ($n_D^{25}=1.4403$) are obtained.

Example 10

576 parts of 3-methyl-4,4-dimethoxy-butine-(1)-ol-(3)

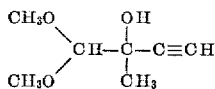

(B.P. 88 to 90° C. at 19 mm. Hg; $n_D^{25}=1.4429$), 1000 parts of tetrahydrofurane, 10 parts of copper-I-chloride and 20 parts of triethylamine are saturated at room temperature with carbon dioxide under a pressure of 40 atmospheres gage for 6 hours. Then the whole is heated up within 18 hours to 80° C. and stirred for 24 hours at this temperature at a carbon dioxide pressure of 40 atmospheres gage. By distillation, 460 parts of 5-methylene-4-methyl-4-dimethoxymethyl-1,3-dioxolane-2-one with the boiling point 130° to 135° C. at 15 mm. Hg $$(n_D^{25}=1.4430)$$

are obtained. By working in an analogous manner under identical conditions, there is obtained from 3-methyl-5,5-dimethoxy-1-pentine-3-ol (boiling point 88° C. at 12 mm.; $n_D^{25}=1.4403$) 5-methylene-4-methyl-4-β-dimethoxyethyl-1,3-dioxolane-2-one with a boiling point of 89° to 90° C. at 0.45 mm. Hg and a melting point of 40° to 41° C.

Example 11

The procedure of Example 10 is followed but 750 parts of 1-ethinyl-cyclo-octanol-(1) are used. 670 parts of 5-methylene-4,4-heptamethylene-1,3-dioxolane-2 - one with the boiling point 111° to 115° C. at 0.3 mm. Hg ($n_D^{25}=1.4906$) are thus obtained.

Example 12

The procedure of Example 9 is followed but 750 parts of 3-phenyl-butine-(1)-ol-(3):

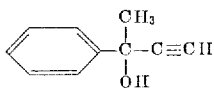

are used. 526 parts of 5-methylene-4-methyl-4-phenyl-1,3-dioxolane-2-one with the boiling point 114° to 118° C. at 0.7 mm. Hg ($n_D^{25}=1.5250$) are thus obtained.

Example 13

336 parts of 3-(alpha-hydroxy-cyclohexyl)-butine-(1)-ol-(3)

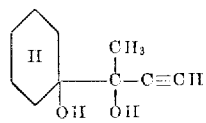

1200 parts of tetrahydrofurane, 10 parts of copper-I-chloride and 25 parts of triethylamine are saturated with carbon dioxide under 40 atmospheres gage pressure for 12 hours at room temperature, then heated within 6 hours to 90° C. and kept for another 12 hours at 90° C. 264 parts of 5-methylene-4-methyl-4-alpha-hydroxy-cyclohexyl-1,3-dioxolane-2-one:

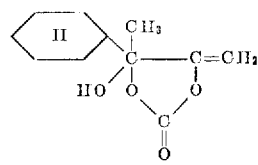

with the melting point 80° to 81° C. are thus obtained.

Example 14

The procedure of Example 10 is followed but 228 parts of 3-methoxymethyl-butine-(1)-ol-(3)

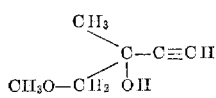

(B.P. 96° C. at 100 mm. Hg; $n_D^{25}=1.4368$) are used. 206 parts of 5-methylene-4-methyl-4-methoxy-methyl-1,3-dioxolane-2-one with the boiling point 121° C. at 20 mm. Hg and the melting point 31° C. are thus obtained.

Example 15

The procedure of Example 1 is followed but 196 parts of 3-methyl-pentine-(1)-ol-(3)

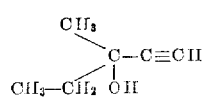

are used. 205 parts of 5-methylene-4-methyl-4-ethyl-1,3-dioxolane-2-one with the boiling point 111° C. at 23 mm. Hg ($n_D^{25}=1.4355$) are thus obtained.

Example 16

The procedure of Example 10 is followed but 512 parts of 3,4-dimethyl-pentine-(1)-diol-(3,4)

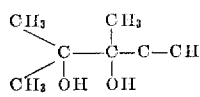

(B.P. 90° to 93° C. at 18 mm. Hg; $n_D^{25}=1.4634$) are used. 85 parts of initial material and 410 parts of 5-methylene-4-methyl-4-alpha-isopropyl-1,3-dioxolane-2-one with the melting point 93° to 96° C. (recrystallized from benzene) are obtained.

Example 17

The procedure of Example 10 is followed but 528 parts of dehydro-nerolidol

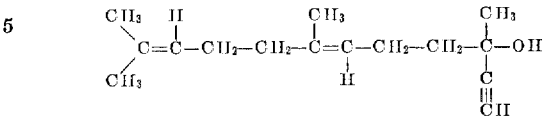

are used. 508 parts of 5-methylene-4-methyl-4-(4,8-dimethyl-nonadiene-3,7)-yl-1,3-dioxolane-2-one with the boiling point 120° C. at 0.05 mm. Hg ($n_D^{25}=1.4788$) are thus obtained.

Example 18

The procedure of Example 1 is followed but 250 parts of 3-normal-butyl-heptine-(1)-ol-(3)

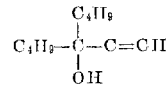

are used. 241 parts of 5-methylene-4,4-di-n-butyl-1,3-dioxolane-2-one with the boiling point 111° C. at 7 mm. Hg ($n_D^{25}=1.4426$) are obtained.

Example 19

The procedure of Example 1 is followed but 250 parts of 3-ethyl-pentine-(1)-ol-(3)

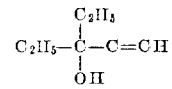

are used. 234 parts of 5-methylene-4,4-diethyl-1,3-dioxolane-2-one with the boiling point 110° C. at 18 mm. Hg ($n_D^{25}=1.4361$) are obtained.

Example 20

The procedure of Example 1 is followed but 250 parts of 3-methyl-hexine-(1)-ol-(3)

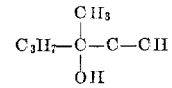

are used. 230 parts of 5-methylene-4-methyl-4-propyl-1,3-dioxolane-2-one with the boiling point 100° C. at 12 mm. Hg ($n_D^{25}=1.4372$) are obtained.

Example 21

336 parts of 1'-hydroxycyclohexyl-3-methoxy-propine-(1)

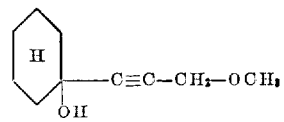

(M.P. 47° to 48° C.), 500 parts of tetrahydrofurane, 20 parts of copper-I-chloride and 50 parts of triethylamine are saturated with carbon dioxide at room temperature in an autoclave for 6 hours under 50 atmospheres gage pressure of carbon dioxide. Then within 8 hours the whole is slowly heated to 80° C. and the mixture kept at this temperature under 50 atmospheres gage of carbon dioxide for another 12 hours.

By distillation of the reaction product, 320 parts of 5-beta - methoxy - ethylidene - 4,4 - pentamethylene - 1,3-dioxolane-2-one

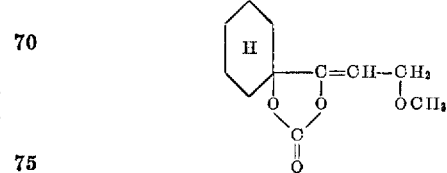

with the boiling point 125° C. at 0.2 mm. Hg and the melting point 44° to 45° C. (recrystallized from petroleum ether) are obtained.

*Example 22*

From 256 parts of 1-methoxy-4-methyl-pentine-(2)-ol-(4)

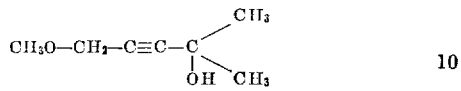

(B.P. 113° to 116° C. at 50 mm. Hg; $n_D^{25}=1.4471$) by working under the same reaction conditions as in Example 21, 234 parts of 5-beta-methoxyethylidene-4,4-dimethyl-1,3-dioxolane-2-one with the boiling point 118° C. at 8 mm. Hg ($n_D^{25}=1.4508$) are obtained.

By using 20 parts of copper formate instead of copper-I-chloride, 209 parts of 5-beta-methoxyethylidene-4,4-pentamethylene-1,3-dioxolane-2-one are obtained.

*Example 23*

From 320 parts of 1-phenyl-3-methyl-butine-(1)-ol-(3)

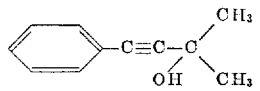

by working under the same process conditions as in Example 21, 22 parts of 5-benzylidene-4,4-dimethyl-1,3-dioxolane-2-one

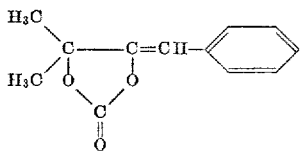

with the boiling point 120° to 130° C. at 0.1 mm. Hg and the melting point 123.5° C. (recrystallized from ethyl acetate and cyclohexane) are obtained.

*Example 24*

From 276 parts of 1-hydroxy-cyclohexyl-propine-(1)

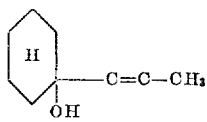

by working under the same process conditions as in Example 21, 96 parts of initial material and 160 parts of 5-ethylidene-4,4-pentamethylene-1,3-dioxolane-2-one with the boiling point 91° C. at 1 mm. Hg ($n_D^{25}=1.4782$) are obtained.

*Example 25*

From 233 parts of 1-hydroxycyclohexyl-3-N-morpholinopropine-(1)

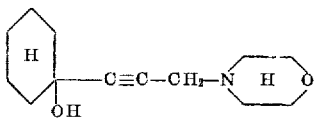

(M.P. 64° C.) by working under the same process conditions as in Example 21, 162 parts of 5-beta-morpholinoethylidene-4,4-pentamethylene-1,3-dioxolane-2-one with the melting point 96° to 98° C. are obtained.

*Example 26*

From 284 parts of 2,5-dimethyl-hexine-(3)-diol-(2,5)

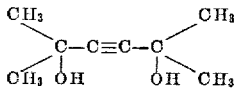

by working under the same conditions as in Example 21, 196 parts of 5-beta-hydroxy-isobutylidene-4,4-dimethyl-1,3-dioxolane-2-one with the melting point 32° C. (recrystallized from benzene) are obtained.

*Example 27*

From 312 parts of 2-methyl-5-acetoxy-pentine-(3)-ol-(2)

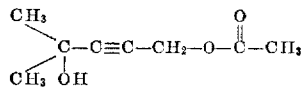

by working under the same conditions as in Example 21, 300 parts of 5-beta-acetoxy-ethylidene-4,4-dimethyl-1,3-dioxolane-2-one with the boiling point 106° C. at 15 mm. Hg ($n_D^{25}=1.4582$) are obtained.

*Example 28*

From 392 parts of 2-methyl-2-hydroxy-dodecine-(3)

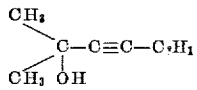

by working under otherwise the same conditions as in Example 21, 60 parts of initial material and 120 parts of 5-n-octylidene-4,4-dimethyl-1,3-dioxolane-2-one with the boiling point 118° C. at 0.1 mm. Hg ($n_D^{25}=1.4438$) are obtained.

*Example 29*

200 parts of methyl-butinol, 10 parts of copper-I-chloride and 25 parts of triethylamine are saturated in an autoclave at room temperature for 12 hours with carbon dioxide under a pressure of 50 atmospheres gage of carbon dioxide. The whole is then heated to 40° C. within 36 hours and kept at this temperature under 50 atmospheres gage of carbon dioxide for 96 hours with stirring By distillation, 205 parts of 5-methylene-4,4-dimethyl-dioxolane-2-one are obtained.

*Example 30*

300 parts of alpha-pyridyl-methyl-ethinyl-carbinol (3-α-pyridyl-1-butine-3-ol), 800 parts of tetrahydrofurane, 5 parts of copper-I-chloride and 15 parts of triethylamine are saturated in an autoclave at room temperature for 8 hours with carbon dioxide under a pressure of 50 atmospheres gage of carbon dioxide. The whole is then heated to 90° C. within 8 hours and kept at this temperature under 40 atmospheres gage of carbon dioxide for 12 hours with stirring.

By distillation of the reaction mixture, 116 parts of 5 - methylene - 4 - alpha-pyridyl-4-methyl-dioxolane-2-one with the boiling point 110° to 118° C. at 1 mm. Hg are obtained.

*Example 31*

The procedure is the same as in Example 30, but 455 parts of γ-diethylaminopropyl-methyl-ethinyl-carbinol (6-diethylamino-2-methyl-1-hexine-3-ol), boiling point 67° to 70° C. at 0.5 mm. Hg. $n_D^{25}=1.4564$, of the formula:

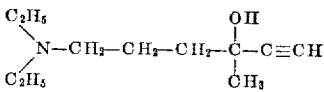

are used.

324 parts of 5-methylene-4-methyl-4-γ-diethylaminopropyl-dioxolane-2-one with the boiling point 108° to 112° C. at 0.8 mm. Hg, $n_D^{25}=1.4539$, are obtained.

*Example 32*

The procedure of Example 30 is followed, but 300 parts of 1-(1'-hydroxy-cyclohexyl)-4-pentene-1-ine (boiling point 76° to 78° C. at 0.5 mm. Hg, $n_D^{20}=1.4889$) are used.

214 parts of initial material are obtained as well as 64 parts of 5-(1-butene-4-ylidene)-spirohexane-dioxolane- 2 - one (5 - γ - butenylidene - 4,4 - pentamethylene - 1,3-dioxolane-2-one) of the formula $$\underset{\underset{CO}{O}}{\overset{}{\diagdown}}\overset{}{\underset{O}{C}}\text{—}C=CH\text{—}CH_2\text{—}CH=CH_2$$

boiling point 136° to 140° C. at 0.2 mm. Hg, $n_D^{25}$=1.5092.

Example 33

By using 250 parts of 1-ethinyl-cyclododecanol and otherwise following the procedure of Example 30, 234 parts of 5-methylene-4,4-spiro-dodecyl-dioxolane-2-one of the boiling point 136° to 143° C. at 0.3 mm. Hg, melting point 84.5° to 85.5° C. (recrystallized from petroleum ether), are obtained.

Example 34

The procedure of Example 30 is followed, but 167 parts of 2-methyl-5-diethylamino-3-pentine-2-ol (boiling point 74° C. at 1.2 mm. Hg; $n_D^{25}$=1.4600) of the formula:

$$\underset{CH_3}{\overset{CH_3}{\diagdown}}\underset{OH}{\overset{}{C}}\text{—}C\equiv C\text{—}CH_2\text{—}N\underset{C_2H_5}{\overset{C_2H_5}{\diagup}}$$

are used.

110 parts of 4-β-diethylaminoethylidene-5,5-dimethyl-dioxolane-2-one of the boiling point 94° to 99° C. at 0.3 mm. Hg, $n_D^{25}$=1.4539, are obtained.

Example 35

294 parts of 3,7,11,15 - tetramethyl - hexadecine-(1)-ol-(3) (dehydro-isophytol), 300 parts of dioxane, 2 parts of copper-I-chloride and 4 parts of triethylamine are saturated in an autoclave at 25° C. for 24 hours with carbon dioxide under a pressure of 50 atmospheres gage of carbon dioxide and then stirred for 36 hours at 80° C. The reaction mixture is filtered and distilled. 290 parts of 4-methyl-4-(4′,8′,12′-trimethyl-hexadecyl)-5-methylene-dioxolane-2-one, $n_D^{25}$=1.4560, pass over at 154° to 158° C. at 0.1 mm. Hg. The compound has the formula:

$$\underset{CH_3}{\overset{CH_3}{\diagdown}}CH\text{—}(CH_2)_3\text{—}\overset{CH_3}{\underset{}{C}}H\text{—}(CH_2)_3\text{—}\overset{CH_3}{\underset{}{C}}H\text{—}(CH_2)_3\text{—}\overset{CH_3}{\underset{\underset{O}{\overset{C}{\diagdown}}O}{C}}\text{—}C=CH_2$$

Example 36

1500 parts of 5-methylene-4,4-dimethyl-1,3-dioxolane-2-one and 1500 parts of water are thoroughly mixed and then 1400 parts of concentrated sodium hydroxide solution are introduced into the mixture, the temperature rising to 70° C. Any precipitated soda is filtered off. Upon further addition of sodium hydroxide solution, the hydroxyketone separates as the top layer. By distillation, 1080 parts of 2-methyl-2-hydroxybutane-3-one (boiling point 140° C. at 760 mm. Hg; $n_D^{25}$=1.4130) are obtained. In a similar manner, 2-methyl-2-hydroxy-3-pentanone (boiling point 71° C. at 40 mm. Hg; $n_D^{25}$=1.4216) is obtained from 5-methylene-4-methyl-5-ethyl-1,3-dioxolane-2-one and 1-acetyl-cyclohexanol-(1) (boiling point 97° C. at 15 mm. Hg; $n_D^{25}$=1.4663) from 5-methylene-4,4-pentamethylene-1,3-dioxolanone.

What we claim is:

1. A compound of the formula:

$$\underset{R_2}{\overset{R_1}{\diagdown}}\underset{O}{\overset{}{C}}\text{—}\underset{\underset{O}{\overset{C}{\diagdown}}O}{\overset{}{C}}=CH_2$$

in which $R_1$ and $R_2$ represent alkyl radicals with 1 to 15 carbon atoms.

2. A compound of the formula:

$$\underset{R_2}{\overset{R_1}{\diagdown}}\underset{O}{\overset{}{C}}\text{—}\underset{\underset{O}{\overset{C}{\diagdown}}O}{\overset{}{C}}=CH_2$$

in which $R_1$ and $R_2$ together represent 4 to 11 methylene groups of a cycloaliphatic ring.

3. 4,4-dimethyl-5-methylene-1,3-dioxolane-2-one.
4. 4-methyl-4-ethyl-5-methylene-1,3-dioxolane-2-one.
5. 4,4 - pentamethylene - 5 - methylene - 1,3 - dioxolane-2-one.
6. A process for the production of substituted 1,3-dioxolane-2-ones of the formula $$\underset{R_2}{\overset{R_1}{\diagdown}}\underset{O}{\overset{}{C}}\text{—}\underset{\underset{O}{\overset{C}{\diagdown}}O}{\overset{}{C}}=CH\text{—}R_3$$

in which $R_1$ and $R_2$ represent members selected from the group consisting of alkyl of from 1 to 15 carbon atoms, alkenyl of from 2 to 15 carbon atoms, alkadienyl of from 4 to 15 carbon atoms, phenyl, alkylphenyl of from 1 to 6 carbon atoms in the alkyl, hydroxyalkyl of from 1 to 15 carbon atoms, alkoxyalkyl of from 1 to 15 carbon atoms in the alkyl and of from 1 to 4 carbon atoms in the alkoxy group, geminal alkoxy alkyl of from 1 to 15 carbon atoms in the alkyl and of 1 to 4 carbon atoms in the alkoxy groups, dialkylaminoalkyl of from 1 to 15 carbon atoms in the alkyl and 2 to 8 carbon atoms in the dialkylamino group, cycloalkyl of from 5 to 12 carbon atoms, hydroxycycloalkyl of from 5 to 12 carbon atoms, pyridyl, alkylpyridyl of from 1 to 4 carbon atoms in the alkyl, and, in which $R_1$ and $R_2$ taken together form an alkylene of from 4 to 11 carbon atoms; and in which $R_3$ represents a member selected from the group consisting of —H, alkyl of from 1 to 10 carbon atoms, alkenyl of 3 carbon atoms, hydroxyalkyl of from 1 to 10 carbon atoms, alkoxy alkyl of from 1 to 10 carbon taoms in the alkyl and of from 1 to 4 carbon atoms in the alkoxy group, an acetylated hydroxyalkyl of from 1 to 10 carbon atoms, a dialkylamino alkyl of from 1 to 10 carbon atoms in the alkyl and 2 to 8 carbon atoms in the dialkylamino group, a morpholino-alkyl of from 1 to 10 carbon atoms in the alkyl and phenyl, wherein an acetylene alcohol of the formula $$\underset{R_2}{\overset{R_1}{\diagdown}}\underset{OH}{\overset{}{C}}\text{—}C\equiv C\text{—}R_3$$

in which $R_1$, $R_2$ and $R_3$ have the meaning set forth above is reacted with carbon dioxide under pressure and at elevated temperature in the presence of a copper salt and an amine having a dissociation constant in water of more than about $10^{-5}$.

7. A compound of the formula $$\underset{R_2}{\overset{R_1}{\diagdown}}\underset{O}{\overset{}{C}}\text{—}\underset{\underset{O}{\overset{C}{\diagdown}}O}{\overset{}{C}}=CH\text{—}R_3$$

in which $R_1$ and $R_2$ represent members selected from the group consisting of alkyl of from 1 to 15 carbon atoms, alkenyl of from 2 to 15 carbon atoms, alkadienyl of from 4 to 15 carbon atoms, phenyl, alkylphenyl of from 1 to 6 carbon atoms in the alkyl, hydroxyalkyl of from 1 to 15 carbon atoms, alkoxyalkyl of from 1 to 15 carbon atoms in the alkyl and of from 1 to 4 carbon atoms in the alkoxy group, geminal alkoxy alkyl of from 1 to 15 carbon atoms in the alkyl and of 1 to 4 carbon atoms in the alkoxy groups, dialkylaminoalkyl of from 1 to 15 carbon atoms in the alkyl and 2 to 8 carbon atoms in the dialkylamino group, cycloalkyl of from 5 to 12 carbon atoms, hydroxycycloalkyl of from 5 to 12 carbon atoms, pyridyl, alkylpyridyl of from 1 to 4 carbon atoms in the alkyl, and, in which $R_1$ and $R_2$ taken together form an alkylene of from 4 to 11 carbon atoms; and in which $R_3$ represents a member selected from the group consisting of —H, alkyl of from 1 to 10 carbon atoms, alkenyl of 3 carbon atoms, hydroxyalkyl of from 1 to 10 carbon atoms, alkoxy alkyl of from 1 to 10 carbon atoms in the alkyl and of from 1 to 4 carbon atoms in the alkoxy group, an acetylated hydroxyalkyl of from 1 to 10 carbon atoms, a dialkylamino alkyl of from 1 to 10 carbon atoms in the alkyl and 2 to 8 carbon atoms in the dialkylamino group, a morpholino-alkyl of from 1 to 10 carbon atoms in the alkyl and a phenyl.

References Cited in the file of this patent

UNITED STATES PATENTS

| 2,563,771 | Adelson | Aug. 7, 1951 |
| 2,873,282 | McClellan | Feb. 10, 1959 |

UNITED STATES PATENT OFFICE
CERTIFICATE OF CORRECTION

Patent No. 3,082,216    March 19, 1963

Peter Dimroth et al.

It is hereby certified that error appears in the above numbered patent requiring correction and that the said Letters Patent should read as corrected below.

Column 5, line 1, for "part sof" read -- parts of --; column 10, lines 19 to 21, the formula should appear as shown below instead of as in the patent:

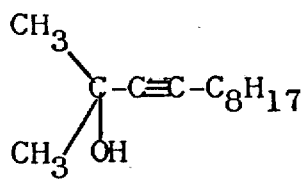

column 12, line 46, for "taoms" read -- atoms --; same column 12, lines 64 to 70, the formula should appear as shown below instead of as in the patent:

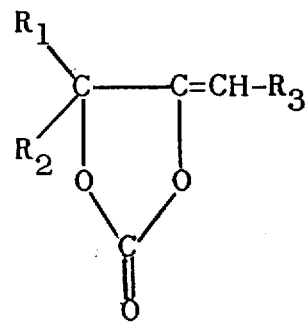

Signed and sealed this 31st day of December 1963.

(SEAL)
Attest:
ERNEST W. SWIDER

Attesting Officer

EDWIN L. REYNOLDS
Acting Commissioner of
Patents